Oct. 12, 1948.   C. L. EKSERGIAN ET AL   2,451,325
INTERNAL EXPANDING VEHICLE BRAKE
Filed Sept. 21, 1943   3 Sheets-Sheet 2
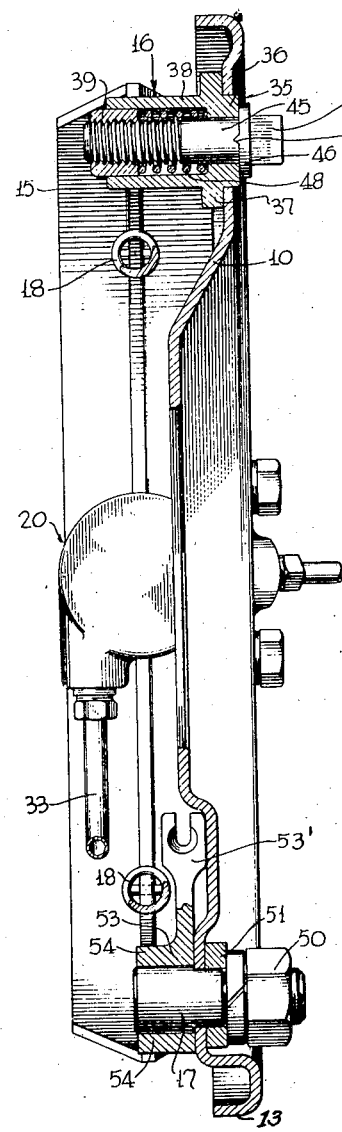
FIG.2.
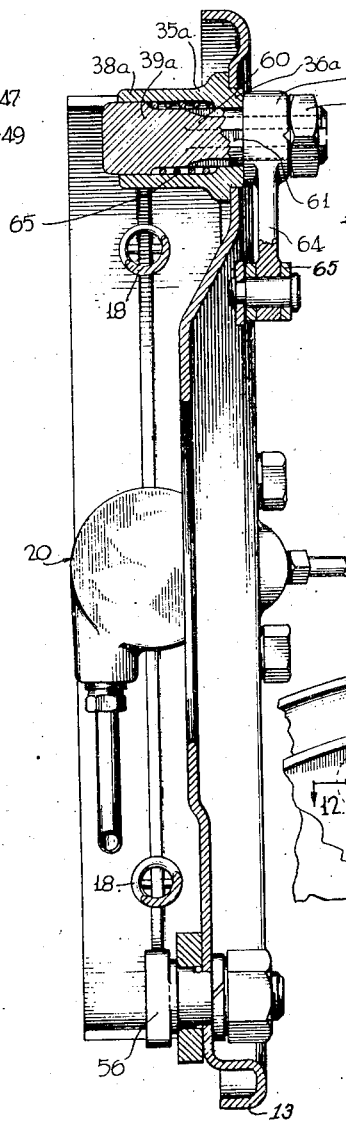
FIG.7
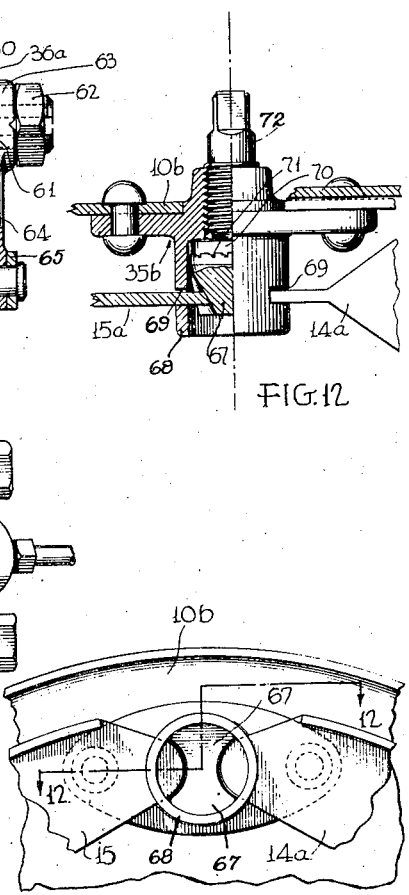
FIG.12
FIG.11.
INVENTORS
Carolus L. Eksergian
Robert B. Temple
Karl C. Harle
BY John P. Tarbox
ATTORNEY Oct. 12, 1948.   C. L. EKSERGIAN ET AL   2,451,325
INTERNAL EXPANDING VEHICLE BRAKE
Filed Sept. 21, 1943   3 Sheets-Sheet 3
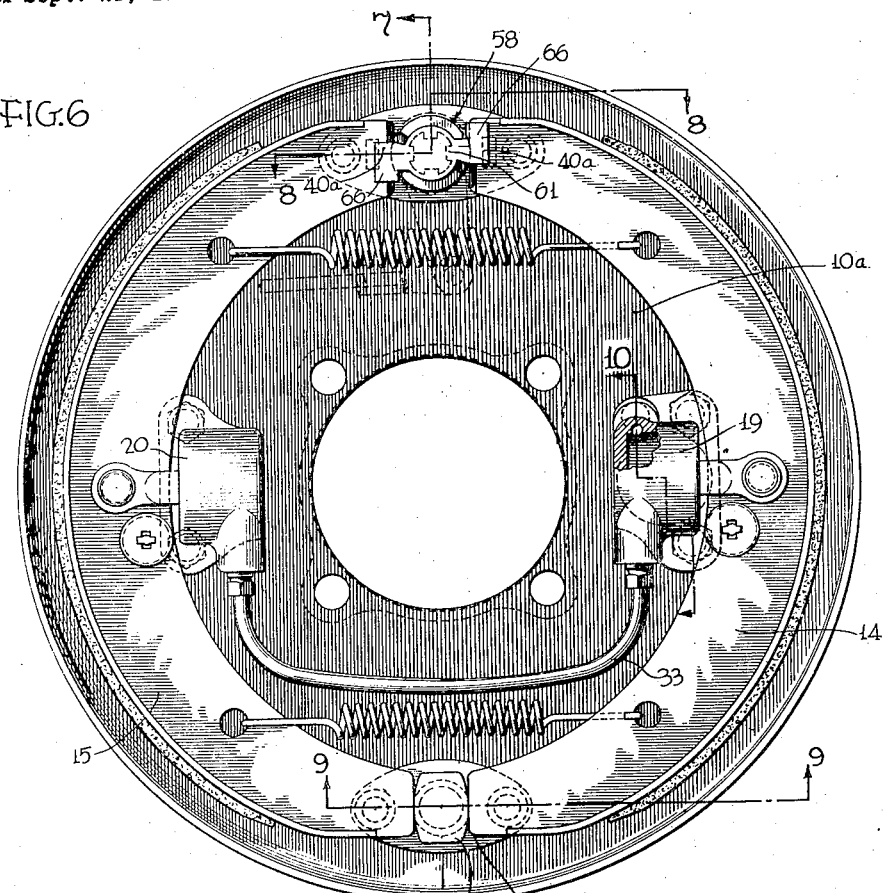
FIG.6
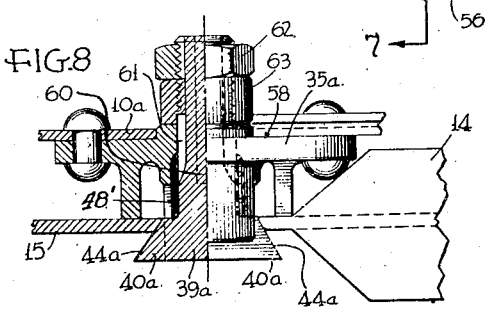
FIG.8
FIG.10
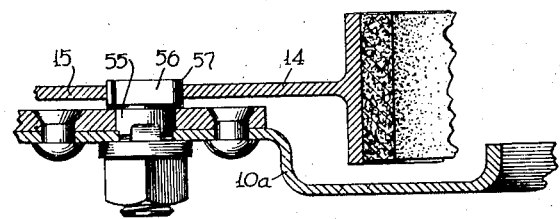
FIG.9
INVENTORS.
Carolus L.Eksergian.
Robert B. Temple
Karl C. Harle
BY
John P. Barbes
ATTORNEY Patented Oct. 12, 1948

2,451,325

UNITED STATES PATENT OFFICE 2,451,325

INTERNAL EXPANDING VEHICLE BRAKE

Carolus L. Eksergian, Detroit, Robert B. Temple, Grosse Pointe Park, and Karl C. Harle, Detroit, Mich., assignors to The Budd Company, Philadelphia, Pa., a corporation of Pennsylvania Application September 21, 1943, Serial No. 503,204

4 Claims. (Cl. 188—78)

The invention relates to brake mechanisms and particularly to such mechanisms of the internally expanding type.

It is an object of the invention to simplify the construction and operation of brakes of this class, thereby facilitating the fabrication and repair thereof, lengthening their life and thus decreasing the cost of manufacture and maintenance.

The invention is particularly concerned with internally expanding brakes of the two-shoe type in which the shoes are symmetrically arranged on opposite sides of a diameter of the part to be braked, and in which both normal fluid actuation and emergency actuation of the shoes are separately provided. Such shoes are usually floatingly mounted both radially and circumferentially to free them for the necessary braking and anchoring movements.

It has been usual for the fluid actuation of such brakes, to secure equal braking in forward and reverse directions, to provide a pair of cylinder actuators between each of the adjacent ends of the shoes, each cylinder carrying a pair of pistons one for each shoe end. By the present arrangement a simple cylinder with a single piston is made to do the work of a double-piston cylinder.

This is accomplished by having the movable piston of such cylinder flexibly engage the central portion of the adjacent shoe to actuate it and to provide simple anchoring means between the shoe ends, which anchoring means may be combined variously with emergency actuating and/or adjusting means for adjusting the shoes for wear.

These and other objects and advantages and the manner in which they are attained will become clear from the following detailed description, when read in connection with the appended drawings forming a part of this specification.

In the drawings:

Figure 2 is a vertical sectional view taken substantially along the line 2—2 of Figure 1, and looking in the direction of the arrows at the end of the section line;

Figure 1:
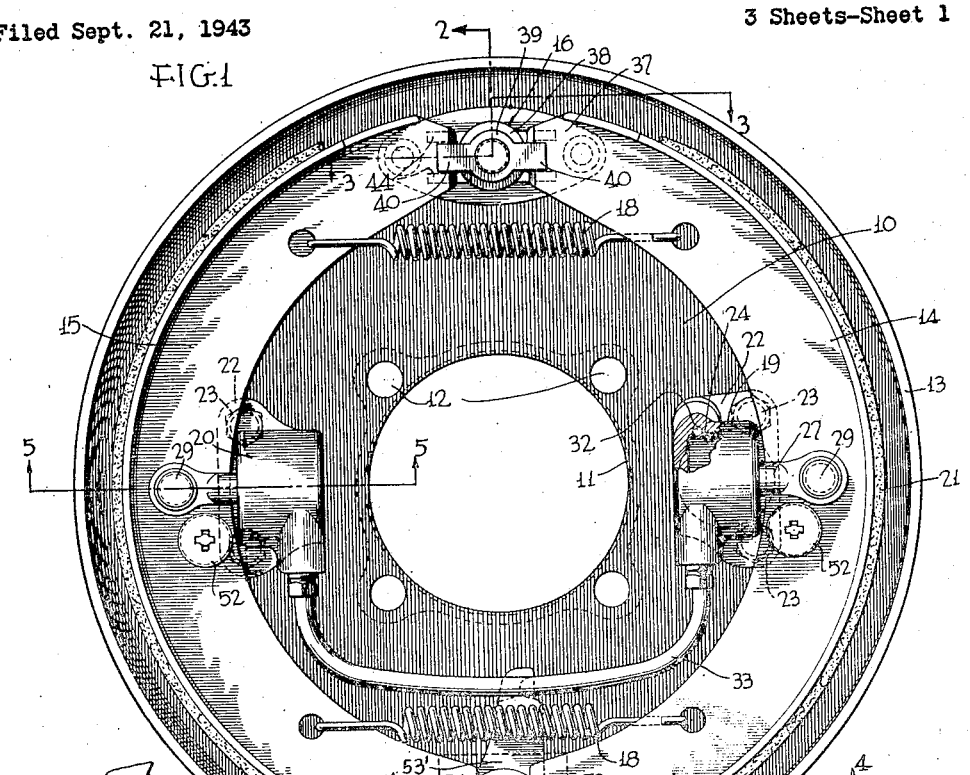
Figure 1 is an elevational view, looking at the inside of the backing plate, showing the brake mechanism of the invention associated therewith, one of the cylinders being partly broken away.

Figures 3, 4 and 5 are detail sectional views on an enlarged scale, taken, respectively, on the lines 3—3, 4—4 and 5—5 of Figure 1;

Figure 5a is a detail sectional view taken on the line 5a—5a of Figure 5;

Figure 6 is an elevational view similar to Figure 1 of a modified arrangement of certain of the elements of the brake mechanism;

Figure 7 is a vertical sectional view, similar to Figure 2, of the modification shown in Figure 6, the section being taken on the line 7—7 of Figure 6;

Figures 8, 9 and 10 are detail sectional views taken respectively, on the lines 8—8, 9—9 and 10—10 of Figure 6;

Figure 11 is a fragmentary elevational view showing a modified anchoring and adjusting means which may be employed in place of the means shown in Figures 1 and 3; and Figure 12 is a detail part sectional view taken substantially on the line 12—12 of Figure 11.

The preferred embodiment of the invention shown in Figures 1 to 5a, inclusive, comprises a backing plate 10 upon which all the non-rotating parts of the brake mechanism are mounted, this backing plate having a central opening 11 to receive the axle housing to which it is adapted to be rigidly secured by an annular series of bolts (not shown) extending through the openings 12 in the backing plate. At its outer periphery the backing plate has a usual axially extending flange 13 overlying the inner margin of the rotary brake drum (not shown) secured to the wheel to be braked.

According to the invention, two symmetrical brake shoes 14 and 15 are mounted on the backing plate, having their opposite ends resting, when in the inactive position shown, against diametrically opposed anchors, the top one designated generally 16 and the bottom one 17. The shoes are held against the anchors, in the off position of the brakes, by a pair of tensioned coil springs 18 interconnecting the opposite ends of the shoes.

Simple actuating means are provided for the shoes consisting of fluid-actuators 19 and 20 engaging the respective shoes adjacent their central portions.

Each shoe may be of the usual T-section, carrying a brake lining 21 secured to the head of the T and having the stem or web of the T-section extend radially inwardly. To give the shoes the required stiffness in their central regions where they are engaged by the actuators, the web in this region is made somewhat wider, tapering toward the ends.

Each of the actuators is similarly constructed and a description of one will in large part suffice for the other, except for the differences to be pointed out. For example, each actuator comprises a cylinder block having an attaching flange 22 rigidly secured to the backing plate by the bolts 23. The inner end of the cylinder is closed by a head integral with the block, the cylinder bore 24 extending radially outwardly to its radially outer open end. A piston 25 is slidably mounted in the cylinder and provided with a suitable sealing ring 26 for preventing the escape of fluid between it and the cylinder bore. This piston 25 is connected to the adjacent shoe by a short strut 27, the outer end of which is bifurcated at 28 and straddles the shoe web to which it is flexibly or pivotally secured by a pin 29.

To allow endwise shifting of the shoe, as 14, associated with an actuator, as 19, the inner end of the strut has a hemispherical end fitting a similarly formed socket 25' in the piston. As shown in Figure 5a, the sides of the socket in a transaxial plane are cut away at 30 to permit the slight endwise or circumferential shifting of the shoe to engage the respective anchors without tendency to cock the piston in the cylinder. A flexible seal 30' prevents the entrance of dirt into the open end of the cylinder.

Normally, the piston 25 may have its inner face substantially in contact with the closed inner end wall of the associated cylinder, and to insure surfaces against which the fluid can react between the piston and cylinder, the inner end of the piston is preferably formed with an annular groove 31 extending to the end of the piston. The port, as 32, through which the fluid enters the cylinder, communicates with the space between piston and cylinder formed by this groove. Another port, not shown, connects this space with a pipe 33 leading to a port 34 in the cylinder of actuator 20 for the shoe 15. This last-named port also communicated with a groove 31 formed in the end of the associated piston. A suitable bleeder port, not shown, may be associated with the actuator cylinder block 20 for facility in filling the system with hydraulic fluid.

The operation of the brake mechanism so far described will take place as follows: Assuming the drum to be braked rotating in clockwise direction, when fluid pressure is supplied to the actuators, the pistons 25 will be forced outwardly, and through the struts 27 the shoes 14 and 15 will be moved outwardly into engagement with the rotating drum. This will cause the ends of the shoes to move a slight distance away from their respective anchors 16 and 17, until the frictional engagement of the shoes and drum is sufficient to carry the shoes around with the drum to bring their heel ends in solidly abutting engagement with the respective anchors. This circumferential movement is permitted by the flexible connection between the shoes and the respective pistons of the actuators 19 and 20. When the fluid pressure is released, the springs 18 return the shoes with all their ends in abutting engagement with the anchors 16 and 17.

To provide for adjustment of the shoes for wear, the upper anchor 16 may be of the special construction now to be described.

It may consist of a unitary anchor block 35 having a central boss 36 fitting a hole in the backing plate 10 and a flange portion 37 fitting against and riveted to the backing plate. A tubular anchor portion 38 extends inwardly from the flange portion between the adjacent shoe ends. This tubular portion slidably receives an adjustable combined spreader and anchor 39, having a central portion slidable within the tubular portion 38 and lateral wings 40 guided in slots 41 extending from its inner end toward the flange 37. Thus the movable anchor and spreader is held against rotation by the slots and wings. The outer ends of the wings 40 are formed with inclined faces, as 42, which engage corresponding inclined faces 43 on the ends of the webs of the respective shoes.

The shoes are spaced from the backing plate at the anchor location by having their webs seated on the inner faces of flanges, as 44, projecting inwardly some distance from the flange portion 37, but less than the tubular portion 38. Thus the ends of the shoes adjacent the anchor are normally securely held in the angles formed by the inclined faces of the sliding spreader and anchor 39 and the adjacent faces of the flanges 44, see Figure 3, by the springs 18. This avoids all looseness and rattling of the parts.

To adjust the spreader and anchor 39, its central portion is provided with a screw-threaded opening and a bolt 45 mounted rotatably in the anchor block 35 has its inner end correspondingly screw-threaded and screwed into said opening. The bolt 45 is prevented from inward movement by a flange 46 engaging the outer face of the boss 36, its extreme outer end being provided with a non-circular portion 47 for cooperation with a wrench or other suitable tool for turning it. It will be seen that rotation of the bolt 45 in the proper direction will move the spreader-anchor 39 outwardly toward the backing plate and the engagement of the inclined faces 44 with the inclined faces 42 of the shoes will adjust the latter outwardly.

To hold the pin 45 in adjusted position a light coil spring 48 may surround the pin and engage at its opposite ends against the block 35 and the anchor spreader 39. This spring allows a radial tooth or teeth 49 on the inner face of the flange 46 on the bolt 45 to pass over corresponding radial serrations formed in the opposed end of the boss 36 and lock in the depressions in the serrations. This construction, also, facilitates the determination of the amount of the adjustment, by counting the clicks as the tooth or teeth 49 fall into successive depressions.

The opposite anchor 17 may be a simple inwardly projecting pin extending through an opening in the backing plate and secured thereto by the arrangement of a nut 50 with its reduced screw-threaded outer end. A pair of washers, as 51, including a split-lock washer, may be inserted between the nut and the backing plate. The adjacent ends of the shoes anchor directly on the pin, see Figure 1, through their web portions, and the shoes adjacent these ends are yieldingly held against the backing plate by any suitable means, such as the devices 52, shown in Figure 1.

The anchor 17 may also be utilized to mount an emergency actuator comprising a sleeve 53 rotatably mounted on the anchor pin and having at top and bottom transversely widened cam portions 54 extending between the shoe ends. The sleeve 53 has secured to it a lever arm 53', having a bifurcated and recessed outer end for the ready securement of an operating cable, see Figure 2. For the emergency application of the brakes the lever and sleeve are rotated causing the diametrically opposite cam portions 54 to engage the respective shoe ends and cam them out to braking engagement with the drum.

In the modification shown in Figures 6, 7, 8, 9 and 10, the shoes are mounted and actuated by means in all respects similar to the showing of Figures 1 to 5, except for changes in the anchoring and emergency actuating means now to be described.

According to this modification, the lower anchor stud 55, secured generally similarly to the anchor 17, to a reinforced offset portion of the backing plate 10a is provided with a vertically elongated head 56 having slightly curved side faces 57 engaged by the adjacent ends of the respective shoes 14 and 15.

According to this modification, the stud 55 serves solely as an anchoring stud and the opposite anchor designated generally by numeral 58 has associated therewith the emergency actuator.

The block 35a of this anchor 58 is generally similar to the anchor block 35 and is similarly secured to the backing plate.

The anchor-spreader, designated generally by reference character 39a, is combined in a unitary piece with the emergency actuator. To this end the anchor-spreader 39a is provided with a stem 60 integral therewith, but of less diameter than its inner end which slidingly fits the tubular portion 38a. The outer end of the stem projecting some distance beyond the backing plate through an opening in the block 35a. This outer end of the stem 60 is splined, as shown at 61, and the extreme end thereof is screw threaded and receives an adjusting nut 62. Between the adjusting nut and the boss 36a of the anchor block 35a is mounted, on the stem 60, the hub 63 of the emergency actuating lever 64, which is connected at its free end to an actuating link or cable 65. The hub 63 of the lever 64 has splines engaging the splines of the stem 60 and is slidable endwise of the stem but rotates therewith.

By turning the nut 62, the anchor-spreader 59 is moved endwise and the shoes are cammed outwardly, in the identical manner shown in the preferred form, to adjust the shoes. In this adjustment the hub 63 of the actuator lever 64 is slid endwise of the stem 60. The nut 62 may be locked in position and give an indication of the amount of the adjustment in the manner shown in connection with the preferred form, a light spring 48' between the inner enlarged end of the stem and the block 35a maintaining the lock, but permitting the necessary endwise movement of the stem.

To provide the necessary movement of the shoes on the turning of the stem 60 by the emergency actuator lever, the lateral wings 40a of the anchor-spreader 39a are widened vertically by extensions 66, one extending upwardly and the other downwardly as shown in Figure 6. This extension insures that, when the stem 60 is rotated in the emergency application, the cam faces 44a formed by lateral wing 40a and their vertical extensions 66 are of sufficient length to push the shoes outwardly into braking engagement under all conditions of wear.

By this arrangement, it will be seen that the anchor, adjuster and emergency actuator are compactly combined into a unitary structure.

In Figures 11 and 12 is shown a modified form of anchoring and adjusting means which may be employed in place of the means shown in Figures 1 to 5. The means there shown comprises a usual form of combined anchor and spreader in which a conical faced spreader block 67 is slidably mounted in a tubular inward extension 68 of the anchor block 35b secured to the backing plate 10b. The adjacent ends of the shoes 14a and 15a are held in place by having their rounded ends of their web portions positioned in slots 69 formed in the extension 68 and resting against the similarly rounded conical faces of the spreader block 67. The latter is adjustable by engagement therewith of an adjusting screw 72 operable from the outside and having an inner enlarged head 70 having radial serrations 71 on its end face engaging corresponding serrations on the spreader block 67. These serrations function similarly to the adjustment serrations referred to in connection with the other forms described.

While several modifications of the invention have been specifically described it will be understood that other modifications might be devised by those skilled in this art falling within the purview of the invention, and it is intended to cover such modifications in the appended claims.

What is claimed is:

1. A brake mechanism comprising a backing plate, a pair of brake shoes movably mounted on said backing plate for movement to operative and inoperative positions, normal actuating means for so moving the shoes, anchor means between adjacent ends of said shoes, said anchor means including a unitary member engaging the adjacent shoe ends and movable endwise for adjusting the shoes and rotarily for providing an emergency actuation of the shoes.

2. A brake mechanism comprising a backing plate having anchor means thereon at diametrically opposite sides thereof, a pair of brake shoes floatingly mounted on the backing plate on opposite sides of the diameter containing the anchor means, actuating means for the shoes comprising a fluid actuator for each shoe flexibly engaging on the backing plate and a piston movable thereof, and brake shoe adjusting and emergency actuator means mounted for rotation and endwise movement between and in engagement with the brake shoe ends associated with one of said anchor means.

3. A brake mechanism comprising a backing plate having anchor means thereon at diametrically opposite sides thereof, a pair of brake shoes floatingly mounted on the backing plate on opposite sides of the diameter containing the anchor means and adapted to alternately engage the respective anchor means for forward and reverse movement, actuating means for the shoes comprising, for each shoe, a brake cylinder mounted on the backing plate and a piston movable therein and having a direct thrust connection pivotally engaging the adjacent shoe substantially centrally thereof, brake shoe adjusting means mounted on one of said anchor means for engagement with one pair of shoe ends, and an emergency actuator cam mounted on the other of said anchor means for engagement with the other pair of shoe ends.

4. A brake mechanism comprising a backing plate having anchor means thereon at diametrically opposite sides thereof, a pair of brake shoes floatingly mounted on the backing plate on opposite sides of the diameter containing the anchor means and adapted to alternately engaged the respective anchor means for forward and reverse movement, actuating means for the shoes comprising, for each shoe, a brake cylinder mounted on the backing plate and a piston movable therein and having a direct thrust connection pivotally engaging the adjacent shoe substantially centrally thereof, and brake shoe adjusting and emergency actuator means associated as a unit with one of said anchor means for engagement with the adjacent shoe ends.

CAROLUS L. EKSERGIAN.
   ROBERT B. TEMPLE.
   KARL C. HARLE.

REFERENCES CITED

The following references are of record in the file of this patent:

UNITED STATES PATENTS

| Number | Name | Date |
|---|---|---|
| Re. 21,380 | La Brie | Mar. 5, 1940 |
| 1,663,147 | Spotz | Mar. 20, 1928 |
| 1,967,398 | Dodge | July 24, 1934 |
| 1,972,829 | Oliver | Sept. 4, 1934 |
| 2,127,741 | La Brie | Aug. 23, 1938 |
| 2,164,878 | Main | July 4, 1939 |
| 2,202,661 | Jeffery | May 28, 1940 |
| 2,294,293 | Goepfrich | Aug. 25, 1942 |
| 2,324,979 | Hatch | July 20, 1943 |

Certificate of Correction

October 12, 1948.

Patent No. 2,451,325.

CAROLUS L. EKSERGIAN ET AL.

It is hereby certified that errors appear in the printed specification of the above numbered patent requiring correction as follows:

Column 6, line 43, claim 2, strike out "on the backing plate and a piston movable" and insert instead *the adjacent shoe substantially centrally*; line 72, claim 4, for the word "engaged" read *engage*;

and that the said Letters Patent should be read with these corrections therein that the same may conform to the record of the case in the Patent Office.

Signed and sealed this 11th day of January, A. D. 1949.

[SEAL]

THOMAS F. MURPHY,
*Assistant Commissioner of Patents.*